US007742676B2

(12) United States Patent
Tilliette et al.

(10) Patent No.: US 7,742,676 B2
(45) Date of Patent: Jun. 22, 2010

(54) HIGH-VOLTAGE BUSHING

(75) Inventors: Vincent Tilliette, Zurich (CH); Jens Rocks, Freienbach (CH); Gerd Chalikia, Ludvika (SE); Roger Hedlund, Ludvika (SE)

(73) Assignee: ABB Research Ltd, Zurich (CH)

( * ) Notice: Subject to any disclaimer, the term of this patent is extended or adjusted under 35 U.S.C. 154(b) by 565 days.

(21) Appl. No.: 11/698,144

(22) Filed: Jan. 26, 2007

(65) Prior Publication Data

US 2007/0158106 A1 Jul. 12, 2007

Related U.S. Application Data

(63) Continuation of application No. PCT/CH2005/000378, filed on Jul. 5, 2005.

(30) Foreign Application Priority Data

Jul. 28, 2004 (EP) ................................. 04405480

(51) Int. Cl.
*H02G 3/18* (2006.01)

(52) U.S. Cl. ................... 385/138; 174/152 R; 174/650; 174/652

(58) Field of Classification Search ................. 385/138; 174/152 R, 650–669
See application file for complete search history.

(56) References Cited

U.S. PATENT DOCUMENTS 3,513,253 A 5/1970 Woods
3,647,938 A 3/1972 Grimmer
3,967,051 A 6/1976 Moore et al.
4,500,745 A * 2/1985 Miggins ................... 174/31 R
2008/0179077 A1* 7/2008 Krivda et al. ........... 174/152 R
2009/0014211 A1* 1/2009 Tilliette et al. .............. 174/650

FOREIGN PATENT DOCUMENTS

DE 1 926 097 1/1970
GB 1018071 1/1966
GB 1022852 3/1966
JP 04-267509 9/1992

OTHER PUBLICATIONS

International Search Report dated Jul. 10, 2005.
International Preliminary Report on Patentability dated Nov. 6, 2006.
European Search Report dated Jan. 3, 2005.

* cited by examiner

*Primary Examiner*—Daniel Petkovsek
(74) *Attorney, Agent, or Firm*—Buchanan Ingersoll & Rooney PC

(57) ABSTRACT

An exemplary high-voltage bushing has a conductor and a core surrounding the conductor, wherein the core includes a sheet-like spacer, which spacer is impregnated with an electrically insulating matrix material. The spacer can have a multitude of holes that are fillable with the matrix material. The spacer can be net-shaped or meshed. It can be a net of fibers. The bushing can be a fine-graded bushing with equalizing plates within the core. As a matrix material, a particle-filled resin can be used.

20 Claims, 1 Drawing Sheet

HIGH-VOLTAGE BUSHING

RELATED APPLICATIONS

This application claims priority under 35 U.S.C. §119 to EP Application 04405480.7 filed in Europe on Jul. 28, 2004, and as a continuation application under 35 U.S.C. §120 to PCT/CH2005/000378 filed as an International Application on Jul. 5, 2005, designating the U.S., the entire contents of which are hereby incorporated by reference in their entireties.

TECHNICAL FIELD

A bushing and a method of production of a bushing and a sheet-like material are disclosed. Such bushings find application, e.g., in transformers, gas-insulated switchgears, generators or as test bushings.

BACKGROUND INFORMATION

Bushings are devices that can carry current at high potential through a grounded barrier, e.g., a transformer tank. In order to decrease and control the electric field near the bushing, condenser bushings have been developed, also known as (fine-) graded bushings. Condenser bushings can facilitate electrical stress control through insertion of floating equalizer (electrode) plates, which are incorporated in the core of the bushing. The condenser core can decrease the field gradient and distribute the field along the length of the insulator, which can provide for low partial discharge readings well above nominal voltage readings.

The condenser core of a bushing can be wound from kraft paper or creped kraft paper as a spacer. The equalization plates can be constructed of either metallic (typically aluminium) inserts or nonmetallic (ink, graphite paste) patches. These plates can be located coaxially so as to achieve an optimal balance between external flashover and internal puncture strength. The paper spacer can ensure a defined position of the electrodes plates and provide for mechanical stability.

The condenser cores of today's bushings are impregnated either with oil (OIP, oil impregnated paper) or with resin (RIP, resin impregnated paper). RIP bushings have the advantage that they are dry (oil free) bushings. The core of an RIP bushing is wound from paper, with the electrode plates being inserted in appropriate places between neighboring paper windings. The resin is then introduced during a heating and vacuum process of the core.

The process of impregnating the paper with oil or with a resin can be slow process.

SUMMARY

A high voltage bushing and a method of production of such a bushing are disclosed. The production process can be accelerated, in particular, the impregnation process can be shortened.

An exemplary bushing has a conductor and a core surrounding the conductor, wherein the core comprises a sheet-like spacer, which spacer is impregnated with an electrically insulating matrix material. The spacer can have a multitude of holes that are fillable with the matrix material.

The conductor can be a rod or a tube or a wire. The core provides for electrical insulation of the conductor and may (but does not have to) contain equalization plates. The core can be substantially rotationally symmetric and concentric with the conductor. The flat spacer can be impregnated with a polymer (resin) or with oil or with some other matrix material. The flat spacer can be paper or, a different material, which can be wound, in spiral form, thus forming a multitude of neighboring layers.

The spacer can be interspersed with holes. The holes can facilitate and accelerate the penetration of the wound spacer (core) with the matrix material. With unpierced paper, as in the state of the art, the matrix material has to creep through one paper layer in order to move radially from between a pair of two neighboring spacer layers to a neighboring pair of two neighboring spacer layers. If the spacer comprises a multitude of holes, the exchange of matrix material in radial direction can be strongly facilitated, and also the penetration of the core of wound spacer material in axial direction can be strongly facilitated, since there is less flow resistance due to more space.

If the holes are large enough and the winding is done accordingly, channels will form within the core, that will quickly guide the matrix material through the core during impregnation.

The holes penetrate the sheet-like spacer substantially in the direction of the short dimension of the sheet-like spacer.

An exemplary advantage of the use of a spacer that has a multitude of holes is, that it allows the use of alternative materials. One exemplary advantage is that the paper can be replaced by other materials, like polymers or organic or anorganic fibers. Where paper is used as a spacer, the paper should be dried thoroughly before impregnation, which is a slow process. Water that would remain in the core due to a too short or otherwise insufficient drying process could destroy the bushing, when it is used at elevated temperature. Another advantage is that the use of a wide variety of matrix materials is possible. With unpierced paper, as in the state of the art, only liquid, unfilled, low-viscosity polymers could be used as matrix materials. These restrictions do not apply to a bushing disclosed herein. This can result in a considerable reduction of the time needed for curing the matrix material. In particular, particle-filled polymers can be used as matrix materials, which can result in several thermomechanical advantages and in an improved (accelerated) bushing produceability.

In an exemplary embodiment the spacer is net-shaped or meshed. The spacer can have a grid of openings. The grid, and the distribution of the openings, respectively, may be regular or irregular. Also the shape of the openings may be constant or may vary throughout the grid.

In another embodiment, the spacer comprises a multitude of fibers, and in particular, the spacer can substantially consist of fibers. Suitable fibers can, e.g., be glass fibers. Various materials can be used in the spacer, which also can be used in form of fibers. For example organic fibers, like polyethylene and polyester, or inorganic fibers, like alumina or glass, or other fibers, like fibers from silicone. Fibers of different materials can also be used in combination in a spacer. Single fibers or bundles of fibers can used as warp and woof of a fabric. It can be an advantage to use fibers that have a low or vanishing water uptake, in particular a water uptake that is small compared to the water uptake of cellulose fibers, which are used in the bushings known from the state of the art.

In another embodiment, the spacer is wound around an axis, which axis is defined through the shape of the conductor. In appropriate radial distances to the axis equalization plates of metallic or semiconducting material are provided within the core.

Such a bushing is a graded or a fine-graded bushing. One single layer of the spacer material can be wound around the conductor or around a mandrel so as to form a spiral of spacer material. In particular in the case of very long bushings, two or more axially shifted strips of spacer material may be wound in parallel. It is also possible to wind a spiral of double-layer or even thicker spacer material; such a double- or triple-layer could then nevertheless be considered as the one layer of spacer material, which spacer material in that case would happen to be double- or triple-layered.

The equalization plates can be a metallic foil, e.g., of aluminium, which are inserted into the core after certain numbers of windings, so that the equalization plates are arranged and fixed in a well-defined, prescribable radial distance to the axis. The metallic or semiconducting material for the equalization plates can also be provided for through application of such material to the spacer, e.g., through spraying, printing, coating, plasma spraying or chemical vapor deposition or the like.

In particular, in the case that fibers form the major part of the spacer, the equalization plates can be formed through spacer fibers, which are at least partially metallic or semiconducting. Such special fibers can, e.g., be metallically or semiconductingly coated over certain lengths of their axial extension.

In another embodiment, the spacer is coated and/or surface treated for an improved adhesion between the spacer and the matrix material. Depending on the spacer material, it can be advantageous to brush, etch, coat or otherwise treat the surface of the spacer, so as to achieve an improved interaction between the spacer and the matrix material. This will provide for an enhanced thermomechanical stability of the core.

In another embodiment the spacer is wound around an axis, which axis is defined through the shape of the conductor, and the size of the holes in the spacer varies along the direction parallel to the axis and/or along the direction perpendicular to that. The impregnation capability can be enhanced through that. If the spacer is, e.g., a rectangular piece of a glass fiber net, which has a short side, which is aligned parallel to the axis, whereas the long side will be wound up to a spiral around the conductor, the size of the holes in the glass fiber net may vary along the short side and/or along the long side. Also the shape of the holes in the spacer material may be varied in such a way.

In an exemplary embodiment, the matrix material comprises filler particles. For example, it comprises a polymer and filler particles. The polymer can for example be an epoxy resin, a polyester resin, a polyurethane resin, or another electrically insulating polymer. The filler particles can be electrically insulating or semiconducting. The filler particles can, e.g., be particles of SiO2, Al2O3, BN, AlN, BeO, TiB2, TiO2, SiC, Si3N4, B4C or the like, or mixtures thereof. It is also possible to have a mixture of various such particles in the polymer. The physical state of the particles can be solid.

Compared to a core with un-filled epoxy as matrix material, there will be less epoxy in the core, if a matrix material with a filler is used. Accordingly, the time needed to cure the epoxy can be considerably reduced, which reduces the time needed to manufacture the bushing.

It can be advantageous if the thermal conductivity of the filler particles is higher than the thermal conductivity of the polymer. And it can also be very advantageous if the coefficient of thermal expansion (CTE) of the filler particles is smaller than the CTE of the polymer. If the filler material is chosen accordingly, the thermomechanical properties of the bushing are considerably enhanced.

A higher thermal conductivity of the core through use of a matrix material with a filler will allow for an increased current rating of the bushing or for a reduced weight and size of the bushing at the same current rating. Also the heat distribution within the bushing under operating conditions is more uniform when filler particles of high thermal conductivity are used.

A lower CTE of the core due to the use of a matrix material with a filler will lead to a reduced total chemical shrinkage during curing. This enables the production of (near) end-shape bushings (machining free), and therefore considerably reduces the production time. In addition, the CTE mismatch between core and conductor (or mandrel) can be reduced.

Furthermore, due to a filler in the matrix material, the water uptake of the core can be largely reduced, and an increased fracture toughness (higher crack resistance) can be achieved (higher crack resistance). Using a filler can significantly reduce the brittleness of the core (higher fracture toughness), thus enabling to enhance the thermomechanical properties (higher glass transition temperature) of the core.

BRIEF DESCRIPTION OF THE DRAWINGS

Exemplary embodiments are illustrated in more detail in the included drawings. The figures show schematically:

FIG. 1A is an enlarged detail of FIG. 1;

The reference symbols used in the figures and their meaning are summarized in the list of reference symbols. Generally, alike or alike-functioning parts are given the same reference symbols. The described embodiments are meant as examples and shall not confine the invention.

DETAILED DESCRIPTION

Figure 1:
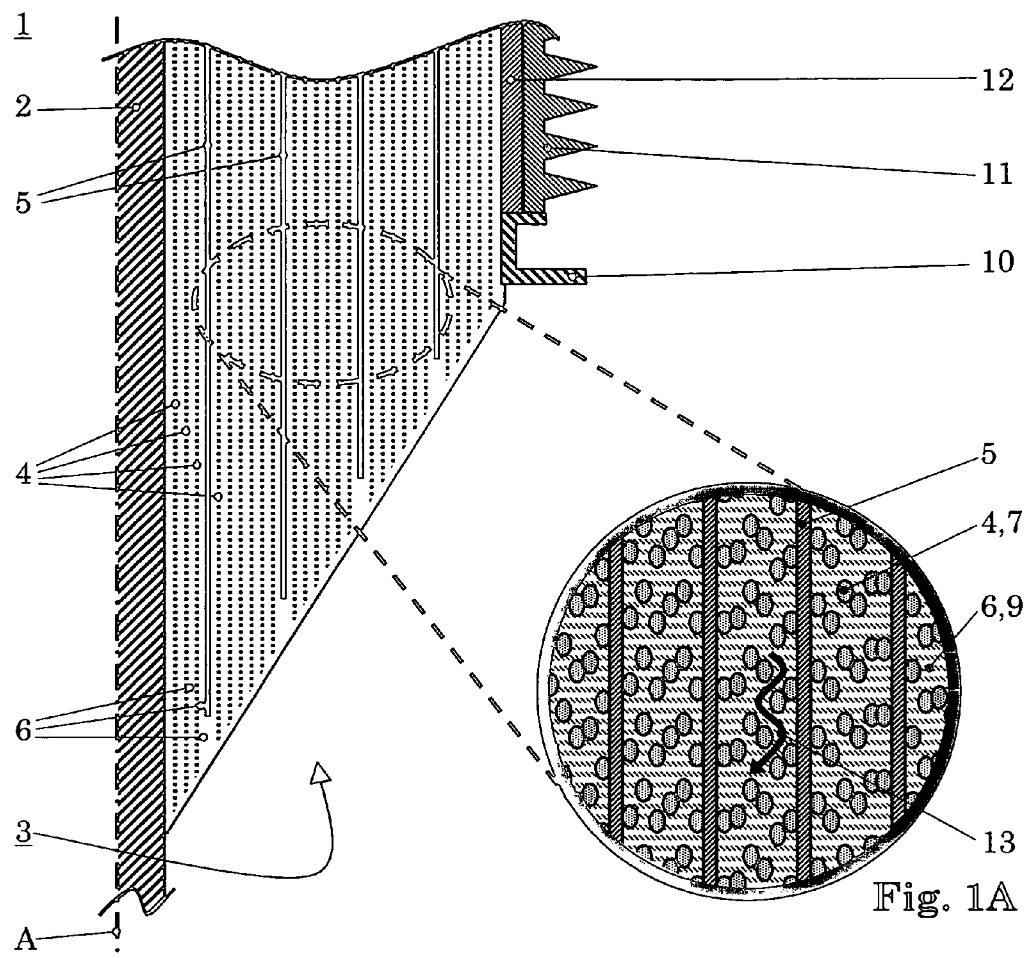
FIG. 1 is a cross-section of an exemplary fine-graded bushing, partial view.

FIG. 1 schematically shows a partial view of a cross-section of an exemplary fine-graded bushing 1. The bushing is substantially rotationally symmetric with a symmetry axis A. In the center of the bushing 1 is a solid metallic conductor 2, which also could be a tube or a wire. The conductor 2 is partially surrounded by a core 3, which also is substantially rotationally symmetric with the symmetry axis A. The core 3 comprises a spacer 4, which is wound around a core and impregnated with a curable epoxy 6 as a matrix material 6. In prescribable distances from the axis A pieces of aluminium foil 5 are inserted between neighboring windings of the spacer 4, so as to function as equalizing plates 5. On the outside of the core, a flange 10 is provided, which allows to fix the bushing to a grounded housing of a transformer or a switchgear or the like. The bushing can be part of a transformer or a switchgear or of another high-voltage installation or high-voltage apparatus, e.g., of a generator. Under operation conditions the conductor 1 will be on high potential, and the core provides for the electrical insulation between the conductor 2 and the flange 10 on ground potential. On that side of the bushing 2, which usually is located outside of the housing, an insulating envelope 11 surrounds the core 3. The envelope 11 can be a hollow composite made of, e.g., porcelain, silicone or an epoxy. The envelope may be provided with sheds or, as shown in FIG. 1, provide sheds. The envelope 11 can protect the core 3 from ageing (e.g., UV radiation, weather) and maintain good electrical insulating properties during the entire life of the bushing 1. The shape of the sheds can be designed such that it has a self-cleaning surface when it is exposed to rain. This avoids dust or pollution accumulation on the surface of the sheds, which could affect the insulating properties and lead to electrical flashover.

In case that there is an intermediate space between the core 3 and the envelope 11, an insulating medium 12, e.g., an insulating liquid 12 like silicone gel or polyurethane gel, can be provided to fill that intermediate space.

The enlarged partial view FIG. 1A of FIG. 1 shows the structure of the core 3 in greater detail. The spacer 4 is sheet-like and has a multitude of holes 9, which are filled with matrix material 6. The spacer 4 is substantially a net 4 of interwoven bundles 7 of glass fibers.

Figure 2:
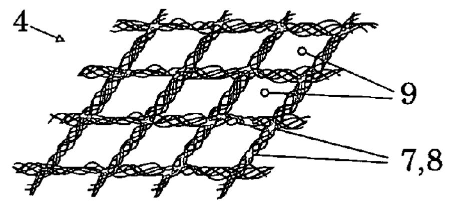
FIG. 2 is a partial view of an exemplary spacer in form of a net of fibers.

FIG. 2 schematically shows such a spacer 4. The bundles 7 of fibers form bridges 8 or cross-pieces 8, through which openings 9 or holes 9 are defined. In a cross-section through such a net, when wound to a spiral, fiber bundles and holes between these are visible, as shown in FIG. 1A.

In FIG. 1A also the equalizing plates 5 are shown, which are inserted in certain distances from the axis between neighboring spacer windings. In FIG. 1A there are five spacer windings between neighboring equalizing plates 5. Through the number (integer or non-integer) of spacer windings between neighboring equalizing plates 5, the (radial) distance between neighboring equalizing plates 5 can be chosen. The radial distance between neighboring equalizing plates 5 may be varied from equalizing plate to equalizing plate.

The holes 9 of neighboring spacer windings overlap, as shown in FIG. 1A, so that channels 13 are formed, into which and through which the matrix material 6 can flow during impregnation. In a core wound from a spacer material without holes, as they are known from the state of the art, channels 13, which radially extend from one side of a spacer winding to the other side of the spacer winding, cannot be formed.

In an exemplary embodiment, there are between 3 and 9 spacer windings (layers) between neighboring equalizing plates 5. It is also possible to have only one spacer layer between neighboring equalizing plates 5, in which case the spacer material, which forms the bridges 8, should be penetratable by matrix material 6 and/or the height of the spacer 4 at the bridges (measured perpendicular to the sheet plane of the sheet-like spacer) should vary, so as to allow matrix material 6 to flow through (radially extending) spaces left between a bridge and a neighboring solid equalization plate 5. In this way, a void-free impregnation of the spacer 4 with matrix material 6 is possible. In case of a net of interwoven bundles of fibers, the bridges 8 are penetrable by matrix material 6, since a fiber bundle is not solid, but leaves space between the fibers forming a bundle. And, in the case of a net of interwoven bundles of fibers, there is a non-constant height of the spacer bridges, since the diameter of a bundle of fibers is not constant, and since the thickness of the spacer is in such a net larger in places, where, for example, warp (e.g., warp fibers) and woof (e.g., woof fibers) overlap, than in the places in between.

Two or more layers of spacer material can be arranged between neighboring equalization plates 5. In that case, channels 13 can be formed through some overlap of holes 9 from neighboring spacer layers.

Instead of bundles 7 of fibers, a net-like spacer 5 can also be formed from single fibers (not shown).

Figure 3:
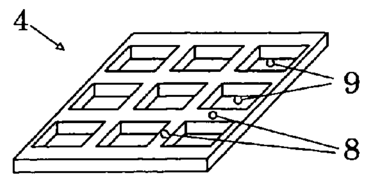
FIG. 3 is a partial view of a spacer.

The spacer 4 can also be structured from a solid piece of material, instead of from fibers. FIG. 3 shows an example. A sheet-like paper or polymer comprises holes 9, which are separated from each other by bridges 8. The shape of the holes can be square, as shown in FIG. 3, but any shape is possible, e.g., rectangular or round or oval.

The matrix material 6 of the core 3 in FIG. 1 can be a particle-filled polymer. For example an epoxy resin or a polyurethane filled with particles of Al2O3. Exemplary filler particle sizes are of the order of 10 nm to 300 μm. The spacer is shaped such that the filler particles can distribute throughout the core 3 during impregnation. In known bushings with (hole-free) paper as a spacer, the paper would function as a filter for such particles. It can easily be provided for channels 13, that are large enough for a flowing through of a particle-filled matrix material 6, as shown in FIG. 1A.

The thermal conductivity of a standard RIP-core with pure (not particle-filled) resin can be about 0.15 W/mK to 0.25 W/mK. When a particle-filled resin is used, values of at least 0.6 W/mK to 0.9 W/mK or even above 1.2 W/mK or 1.3 W/mK for the thermal conductivity of the bushing core can readily be achieved.

In addition, the coefficient of thermal expansion (CTE) can be much smaller when a particle-filled matrix material 6 is used instead of a matrix material without filler particles. This can result in less thermomechanical stress in the bushing core.

An exemplary production process of a bushing as described in conjunction with FIG. 1 comprises the steps of winding the spacer 4 (in one or more strips or pieces) onto the conductor 2, adding the equalization electrodes 5 during winding, applying a vacuum and applying the matrix material 6 to the vacuumized core 3 until the core 3 is fully impregnated. The impregnation under vacuum takes place at temperatures of, for example, between 50° C. and 90° C. Then the epoxy matrix material 6 is cured (hardened) at a temperature of, for example, between 100° C. and 140° C. and eventually post-cured in order to reach the desired thermomechanical properties. Then the core is cooled down, machined, and the flange 10, the insulating envelope 11 and other parts are applied.

In general, the spacer should have a grid of holes. The grid does not necessarily have to be evenly spaced in any direction. And the shape and the area of the holes does not necessarily have to be evenly spaced in any direction. In particular, it can be advantageous to vary the size (area) of the holes along the axial direction and/or perpendicular to the axial direction, such that a void-free impregnation of the core is facilitated.

The openings 9 in a spacer can have a lateral extension of the order of, for example, 0.5 mm to 5 cm, in particular 2 mm to 2 cm, whereas the thickness of the spacer 4 and the width of the bridges 8 can be, for example, of the order of 0.03 mm to 3 mm, in particular 0.1 mm to 0.6 mm. The area consumed by the holes 9 is usually at least as large as the area consumed by the bridges. In the plane of the spacer sheet, the area consumed by the holes 9 is, for example, between 1 and 5 orders of magnitude, in particular 2 to 4 orders of magnitude larger than the area consumed by the bridges.

The use of a spacer 4 with a multitude of holes can allow the production of a paperless dry (oil-free) bushing. This can be advantageous, because the process of drying the spacer before impregnation can be quickened or even skipped.

Instead of inserting pieces of metallic foil between the spacer windings, equalization plates 5 may also be formed through application of conductive of semiconducting material directly to the spacer 4. In a case where the spacer 4 is made from fibers, it is possible to incorporate conductive or semiconducting fibers in the spacer net.

Exemplary voltage ratings for high voltage bushings are between, for example, about 50 kV to 800 kV, at rated currents of, for example, 1 kA to 50 kA.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

LIST OF REFERENCE SYMBOLS

1 bushing, condenser bushing
2 conductor
3 core
4 spacer, net, grid of meshes
5 equalizing plate, aluminium foil
6 matrix material, epoxy
7 bundle of fibers
8 cross-piece, bar, bridge
9 hole, opening
10 flange
11 insulating envelope (with sheds), hollow core composite
12 insulating medium, gel
13 channel
A axis

What is claimed is:

1. A bushing comprising:

a conductor; and a core surrounding the conductor, the core comprising a spacer in sheet form, said spacer is impregnated with an electrically insulating matrix material, and is wound, in spiral form, so that the spacer includes plural neighboring layers, wherein the spacer is net-shaped or meshed and comprises plural interwoven fibers and has plural holes that are filled with the matrix material.

2. The bushing according to claim 1, wherein the spacer is wound around an axis, that is defined by the shape of the conductor, and wherein plural equalization plates of conductive, metallic or semiconducting material are provided in the core at radial distances from the axis.

3. The bushing according to claim 2, wherein the as equalization plates are formed through fibers of the spacer, which are at least partially conductive, metallic, or semiconducting.

4. The bushing according to claim 3, wherein the axis equalization plates are formed by applying a metallic or semiconducting material to the spacer.

5. The bushing according to claim 1, wherein the spacer is at least one of coated surface treated to form an adhesive surface between the spacer and the matrix material.

6. The bushing according to claim 1, wherein the spacer is wound around an axis, said axis is defined through the shape of the conductor, and wherein a size of holes in the spacer varies along at least one of a direction parallel to the axis along a, direction perpendicular to that direction.

7. The bushing according to claim 1, wherein the matrix material comprises filler particles.

8. The bushing according to claim 7, wherein the filler particles are electrically insulating or semiconducting.

9. The bushing according to claim 8, wherein at least one of a thermal conductivity of the filler particles is higher than a thermal conductivity of the polymer, and/or wherein a coefficient of thermal expansion of the filler particles is smaller than a coefficient of thermal expansion of the polymer.

10. A high-voltage apparatus or a generator, comprising:

a bushing according to claim 1.

11. The bushing according to claim 1, wherein the spacer comprises plural fibers.

12. The bushing according to claim 11, wherein the spacer is wound around an axis, which axis is defined through a shape of the conductor, and wherein axis equalization plates of conductive, metallic, or semiconducting material are provided in the core at radial distances from the axis.

13. The bushing according to claim 12, wherein the axis equalization plates are formed through fibers of the spacer, which are at least partially conductive, metallic, or semiconducting.

14. The bushing according to claim 13, wherein the spacer is at least one of coated and surface treated to form an adhesive surface between the spacer and the matrix material.

15. The bushing according to claim 14, wherein the matrix material comprises filler particles.

16. The bushing according to claim 15, wherein at least one of a thermal conductivity of the filler particles is higher than a thermal conductivity of the polymer, and a coefficient of thermal expansion of the filler particles is smaller than a coefficient of thermal expansion of the polymer.

17. The bushing according to claim 1, wherein the spacer has a grid of openings.

18. The bushing according to claim 17, wherein the grid and the distribution of openings are uniform.

19. The bushing according to claim 1, wherein in a cross section of the spacer wound in spiral form fiber bundles and holes between these are visible.

20. The bushing according to claim 1, wherein plural channels are formed and extend radially from one side of the spacer winding to another side of the spacer winding through an overlap of holes between neighboring layers within the core, wherein the channels guide the matrix material through the core.

* * * * *